(12) United States Patent
Frederiksen

(10) Patent No.: US 8,643,207 B2
(45) Date of Patent: Feb. 4, 2014

(54) WIND TURBINE WITH IMPROVED YAW CONTROL

(75) Inventor: Thomas Frederiksen, Randers NV (DK)

(73) Assignee: Vestas Wind Systems A/S, Aarhus N (DK)

( * ) Notice: Subject to any disclaimer, the term of this patent is extended or adjusted under 35 U.S.C. 154(b) by 697 days.

(21) Appl. No.: 12/827,822

(22) Filed: Jun. 30, 2010

(65) Prior Publication Data

US 2011/0006541 A1 Jan. 13, 2011

Related U.S. Application Data

(60) Provisional application No. 61/221,928, filed on Jun. 30, 2009.

(30) Foreign Application Priority Data

Jun. 30, 2009 (DK) .................................. 2009 70047

(51) Int. Cl.
*F03D 9/00* (2006.01)

(52) U.S. Cl.
USPC .......................................................... 290/55

(58) Field of Classification Search
USPC .................................. 290/44, 55; 416/244 R
See application file for complete search history.

(56) References Cited

U.S. PATENT DOCUMENTS 2,862,400 A  12/1958 Angelo
7,944,070 B2 * 5/2011 Rosenvard et al. ............. 290/44
8,203,230 B2 * 6/2012 Hennig ............................ 290/55
8,242,618 B2 * 8/2012 Numajiri ......................... 290/44
8,341,840 B2 * 1/2013 Kawano et al. ............... 29/889.1
8,348,598 B2 * 1/2013 Watanabe ..................... 415/131

(Continued)

FOREIGN PATENT DOCUMENTS

DE   102005033921 A1   1/2007
DE   102005039434 A1   2/2007

(Continued)

OTHER PUBLICATIONS

European Patent Office, European Search Report issued in corresponding EP Application Serial No. 10167959.5-1267 issued on Jul. 2, 2012.

(Continued)

*Primary Examiner* — Tulsidas C Patel
*Assistant Examiner* — Viet Nguyen
(74) *Attorney, Agent, or Firm* — Wood, Herron & Evans, LLP

(57) ABSTRACT

A wind turbine having a tower and a nacelle mounted on top of the tower. The turbine further includes a bearing for a yaw motion of the nacelle in relation to the tower, and a drive assembly for the yaw motion. The device assembly includes at least one power unit fixedly connected to the nacelle. The power unit has a motor and a wheel adapted to be driven by the motor and in engagement with a ring fixedly connected to the tower for effecting the yaw motion, wherein a region of engagement of the ring with the wheel is located separate from the bearing, characterized in that the motor is located below the wheel. Preferably, the bearing is a friction bearing comprising an insert portion fixedly connected to the nacelle, and a clamp portion fixedly connected to the tower and in clamping engagement with the insert portion.

18 Claims, 4 Drawing Sheets

(56) References Cited

U.S. PATENT DOCUMENTS

| | | |
|---|---|---|
| 2006/0205554 A1* | 9/2006 | Nohara et al. ............... 475/179 |
| 2008/0150292 A1* | 6/2008 | Fedor et al. .................... 290/55 |
| 2010/0109327 A1* | 5/2010 | Nielsen et al. ................. 290/44 |
| 2010/0129221 A1* | 5/2010 | Huxley-Reynard et al. ........................ 416/169 R |
| 2010/0181769 A1* | 7/2010 | Altemark et al. .............. 290/44 |
| 2011/0012360 A1* | 1/2011 | Numajiri ......................... 290/55 |
| 2011/0057451 A1* | 3/2011 | Volmer et al. .................. 290/55 |
| 2011/0215576 A1* | 9/2011 | Minami et al. ................. 290/44 |
| 2011/0233939 A1* | 9/2011 | Noda et al. ..................... 290/55 |
| 2011/0254281 A1* | 10/2011 | Noda et al. ..................... 290/55 |
| 2011/0268568 A1* | 11/2011 | Scholte-Wassink ............. 416/1 |
| 2011/0309620 A1* | 12/2011 | Fujino et al. ................... 290/44 |

FOREIGN PATENT DOCUMENTS

| | | | |
|---|---|---|---|
| EP | 0754881 A2 | 1/1997 | |
| EP | 1371845 A2 | 12/2003 | |
| EP | 1 571 334 | 3/2004 | |
| EP | 1571334 A1 | 9/2005 | |
| WO | WO 2005015011 A1 * | 2/2005 | ............... F03D 7/04 |
| WO | 2008053017 A2 | 5/2008 | |
| WO | WO 2008/074320 | 6/2008 | |
| WO | WO 2008129311 A2 * | 10/2008 | |

OTHER PUBLICATIONS

Ed R Gasch, "Windkraftanlagen", Jan. 1, 1999, Windkraftanlagen. Grundlagen Und Entwurf, Stuttgart: B.G., Teubner, DE, pp. 72, 90, XP002130509.

* cited by examiner

WIND TURBINE WITH IMPROVED YAW CONTROL

FIELD OF THE INVENTION

The invention relates to a wind turbine comprising a tower and a nacelle mounted on top of the tower, the turbine further comprising a bearing for a yaw motion of the nacelle in relation to the tower, and a drive assembly for the yaw motion.

DESCRIPTION OF THE RELATED ART

In the wind power industry there is an increased focus on turbines with increased sizes and power outputs, which entails issues regarding the handling of turbine loads. Such loads include loads on the yaw system, which require large components, such as bearing elements and power units with motors effecting yaw motions. However, known yaw systems provide difficulties in obtaining a compact and transportable nacelle design, and/or provide limitations of the volume for access during assembly and service. For example, the drive assemblies disclosed in WO2008/077983A1, DE102007/056763A1 and EP1571334A1 take a considerable space in the nacelle and therefore restricts the volume in it. Further, WO2008/053017A2 describes a system entailing difficulties in servicing integrated bearing and drive elements.

SUMMARY OF THE INVENTION

An object of the invention is to provide a wind turbine yaw system that allows a compact and transportable nacelle design, and/or more volume access during assembly and service.

This object is reached with a wind turbine according to that described below. Thus the invention provides a wind turbine comprising a tower and a nacelle mounted on top of the tower, the turbine further comprising a bearing for a yaw motion of the nacelle in relation to the tower, and a drive assembly for the yaw motion, in turn comprising at least one power unit mounted to the nacelle, the power unit comprising a motor and a wheel adapted to be driven by the motor and in engagement with a ring fixedly connected to the tower for effecting the yaw motion, wherein a region of engagement of the ring with the wheel is located separated from the bearing, characterized in that the motor is located below the wheel.

Since the motor is located below the wheel, the power unit can protrude downwards into the tower rather than upwards into the nacelle. This in combination with the separation from the bearing of the region of engagement of the wheel with the tower frees volume in the nacelle and improves access of yaw system parts for assembly and service. Basically, the volume and access constraint problems are solved by inverting the power unit(s) and separating yaw bearing and yaw drive components so that they can all be individually accessed by construction and service personnel from the tower, while not intruding into the limited space of the nacelle. In other words, critical yaw system parts are separated and integrated into the tower top instead of the nacelle. The tower top has no neighbouring components, hence fewer constraints.

The invention provides for large and easily accessible space for power units for the yaw motion of the wind turbine. This provides for a high flexibility regarding upgrade of individual turbines, for example based on turbulence intensity, and also easy scaling up of the yaw system for large turbines. Further, the region of engagement of the ring with the wheel being located separated from the bearing provides for components of the yaw system being easily replaceable.

It should be noted that the power unit motor can be in any suitable form, for example electric or hydraulic. The ring fixed to the tower can be a gear ring, and the power unit wheel can be a gear wheel, the teeth of which are adapted to engage the teeth of the gear ring. Alternatively, the wheel can be in a friction engagement with the ring for effecting the yaw motion. Here the region of engagement of the ring with the wheel, or the ring to wheel engagement region, means all areas of the wheel and the ring which during normal operation would come into contact or engagement with the ring and wheel, respectively.

Preferably, the region of engagement of the ring with the wheel is located below the bearing. Thereby the ring can be accessed, serviced or replaced without manipulation or disassembly of the bearing.

Preferably, the ring is located inside the tower. In embodiments, where the ring is located below the bearing, this facilitates ring replacement.

Preferably, the region of engagement of the ring with the wheel is located on an inner side of the ring. This means, in embodiments with ring gear teeth or a ring friction surface, that such teeth or such a surface is facing inwards. Thereby, the power unit(s), with the motor located below the wheel, can be mounted, accessed, serviced or replaced from a convenient position inside the tower, under the nacelle. For example, a floor for assembly and service personnel can be arranged inside the tower allowing such personnel to stand comfortably straight with plenty of room while working on said units. Also, especially in embodiments where the ring to wheel engagement region is located below the bearing, the ring can be mounted, accessed, serviced or replaced from a convenient position inside the tower, under the nacelle.

Preferably, the ring comprises at least two ring members distributed in the longitudinal direction of the tower. In some embodiments, the ring can be provided in the form of two stacked ring members, which reduces the need for a rigid suspension, reduces weight and enables replacement without critical loss of strength. Thereby it is possible to reduce asymmetric deflection of the ring, without adding material for it, which in turn makes it possible to reduce the weight of the yaw system.

It should be noted that in embodiments of the invention, each ring member can be provided as an integrated unit. However, in preferred embodiments, each ring member comprises of a plurality of circumferentially distributed ring segments, wherein the ring segments of one ring member are circumferentially staggered in relation to the ring segments of another ring member, so that joints between ring segments in the one ring member are not aligned with joints between ring segments in the other ring member. In other words, the ring segments of the one ring member overlap transitions between ring segments of the other ring member. The division of ring members into ring segments facilitates replacement. While the transition between two ring segments is critical regarding strength, the staggered arrangement of the ring segments of different ring members ensures that the one of the ring members will provide full strength while the wheel of a power unit transverses the joint between two ring segments of the other ring member. However, it should be noted that within the scope of the claims, the ring can comprise only one ring member, comprising one or more ring segments.

Preferably, the bearing is a friction bearing comprising an insert portion fixedly connected to the nacelle, and a clamp portion fixedly connected to the tower and in clamping engagement with the insert portion. Thereby, preferably, the connection of the insert portion to the nacelle is located inside the clamp portion. The clamp portion can be mounted directly onto the tower top flange or on one or more intermediate interface parts. The insert portion and clamp portion arrangement enables preassembly of the entire yaw system as a separate unit prior to mounting it on the tower. Further, mounting the clamp portion on the tower provides for a gentle load transfer between nacelle and tower.

Preferably, the at least one power unit is mounted on the insert portion.

Preferably, the wind turbine comprises at least one radial adjustment element fixedly connected to the nacelle, and comprising an adjustment portion adapted to act on the tower or a part fixedly connected thereto so as to adjust the radial position of the nacelle in relation to the tower. The radial adjustment element(s) can be fixedly connected to the nacelle directly or intermediately, for example, by being mounted on the insert portion of the bearing. The adjustment portion can for example be adapted to act on the clamp portion of the bearing, or directly on the tower. In preferred embodiments, the radial adjustment element can be adapted to adjust the radial position of the nacelle in relation to the tower by adjusting the location of the insert portion in relation to the clamp portion.

BRIEF DESCRIPTION OF THE DRAWINGS

Below, embodiments of the invention will be described with reference to the drawings, in which.

DETAILED DESCRIPTION OF THE PRESENTLY PREFERRED EMBODIMENTS

Figure 1:
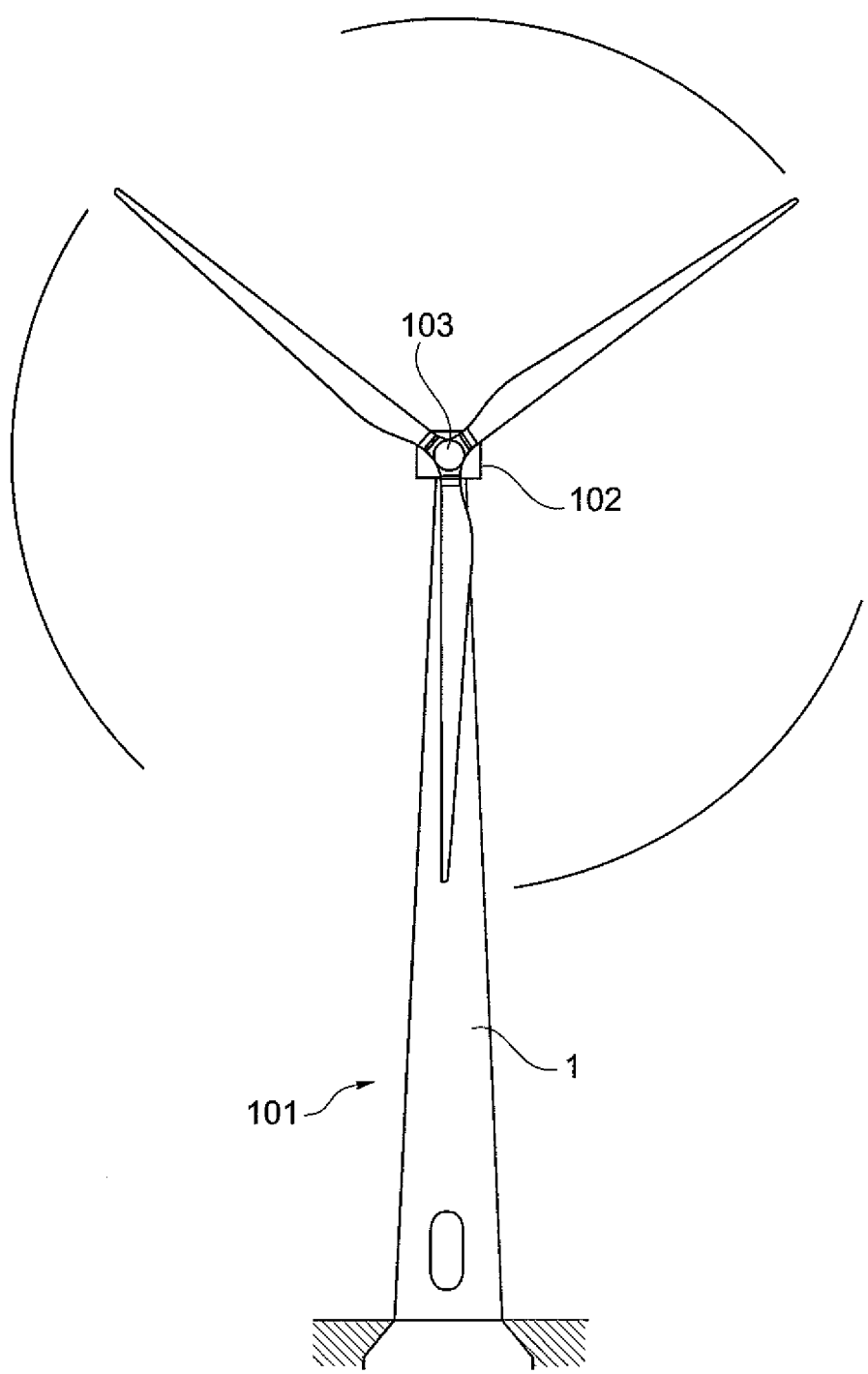
FIG. 1 shows a front view of a wind turbine.
Figure 2:
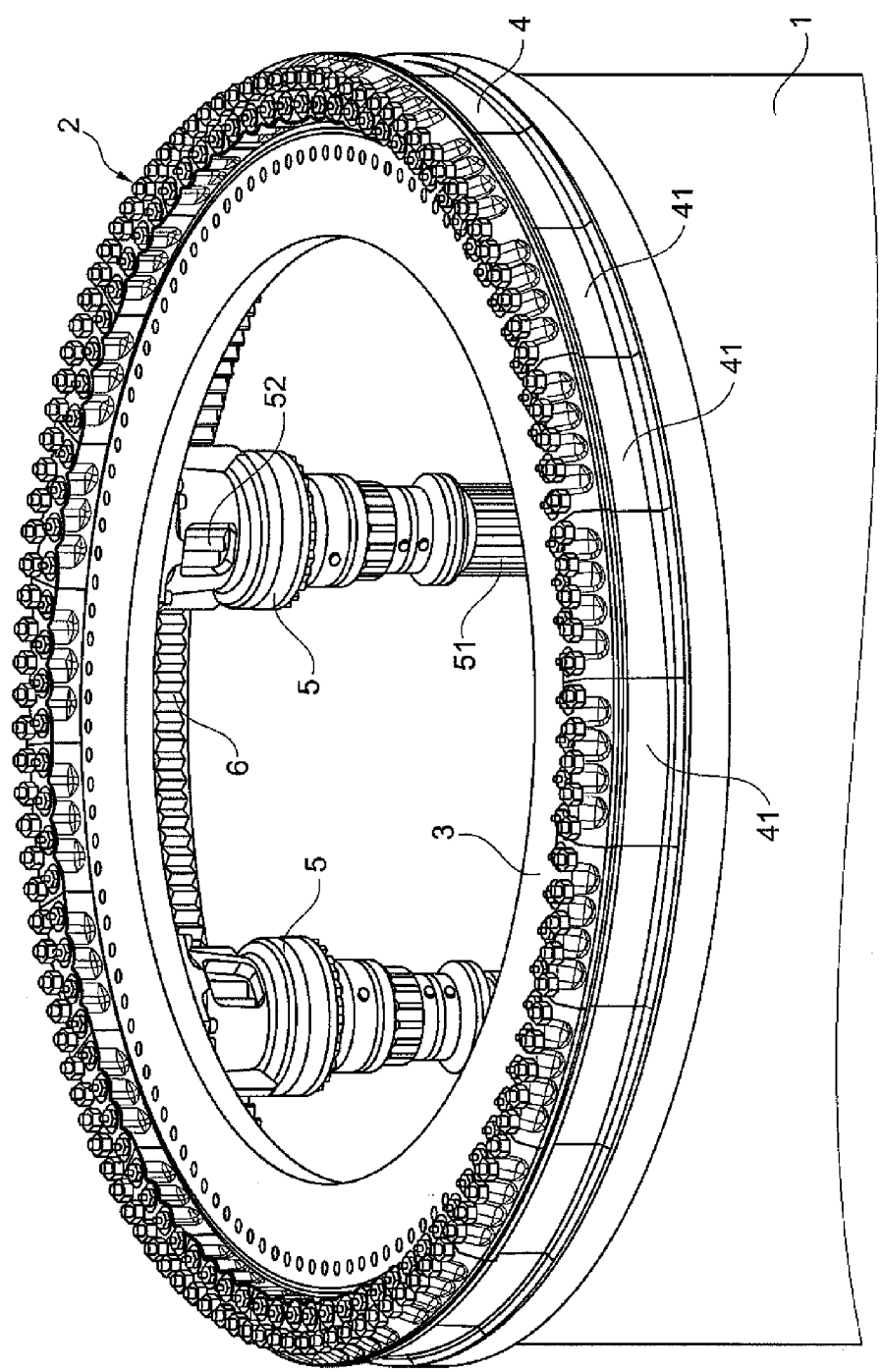
FIG. 2 shows a perspective view from above of a top of a tower for the turbine in FIG. 1, with a yaw system.

FIG. 1 shows a wind turbine 101, with a tower 1, a nacelle 102, and a rotor 103 including a hub and three blades. FIG. 2 shows a top of the tower 1 with a yaw system 2. The nacelle 102 is mounted onto the yaw system. The yaw system 2 comprises a bearing for a yaw motion of the nacelle 102 in relation to the tower 1. The bearing is a friction bearing comprising an insert portion 3 fixedly connected to the nacelle 102.

Figure 3:
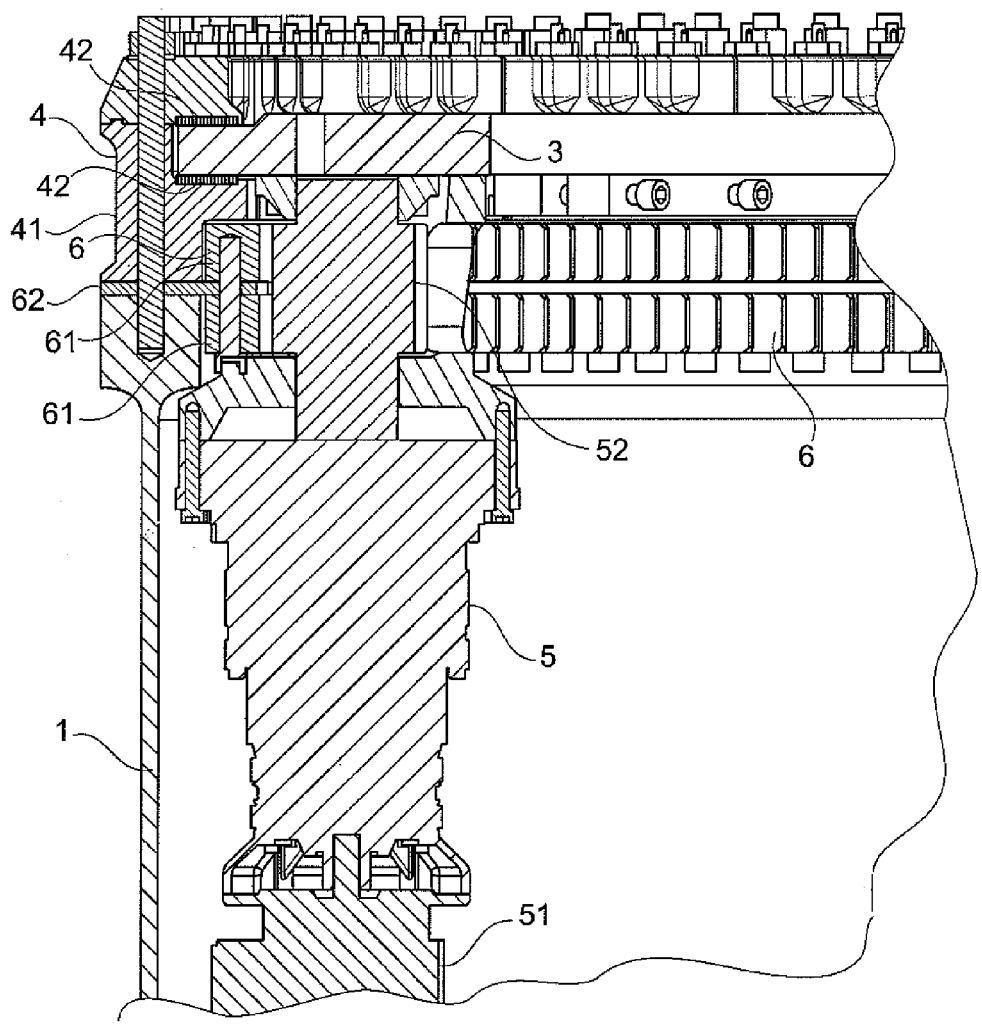
FIG. 3 shows a vertical cross-section of a part of the yaw system in FIG. 2.

As can be seen in FIG. 3, the bearing also comprises a clamp portion 4 fixedly connected to the tower and in clamping engagement with the insert portion 3. The connection of the insert portion 3 to the nacelle 102 (FIG. 1) is located inside the clamp portion 4. The nacelle 102 is mounted on top of the insert portion 3. The clamp portion 4 is bolted to a top flange of the tower 1. The clamp portion comprises a plurality of circumferentially distributed clamping elements 41. Further, the clamp portion 4 presents a plurality of friction elements 42 arranged to be in contact with the insert portion 3 to allow a low friction sliding movement of the insert portion 3 in the clamp portion 4. In this example, each clamping element 41 houses one friction element 42. For damping purposes, preferably a constant or variable pretension load is applied to the upper friction elements 42.

The yaw system 2 comprises a drive assembly for the yaw motion. The drive assembly comprises a number of power units 5 mounted on the insert portion 3, more specifically in a lower side of the insert portion 3. Each power unit 5 comprises an electric motor 51 and a gear wheel 52 adapted to be driven by the motor 51, and located above the motor 51. The wheel 52 is, below the bearing 3, 4, in engagement with a teethed, inwards facing surface of a gear ring 6 fixedly connected to the tower 1 for effecting the yaw motion.

As can be seen in FIG. 3, the ring 6 comprises two ring members 61 distributed in the longitudinal direction of the tower 1. The ring members 61 are mounted to the tower 1, via a ring carrier 62.

Figure 4:
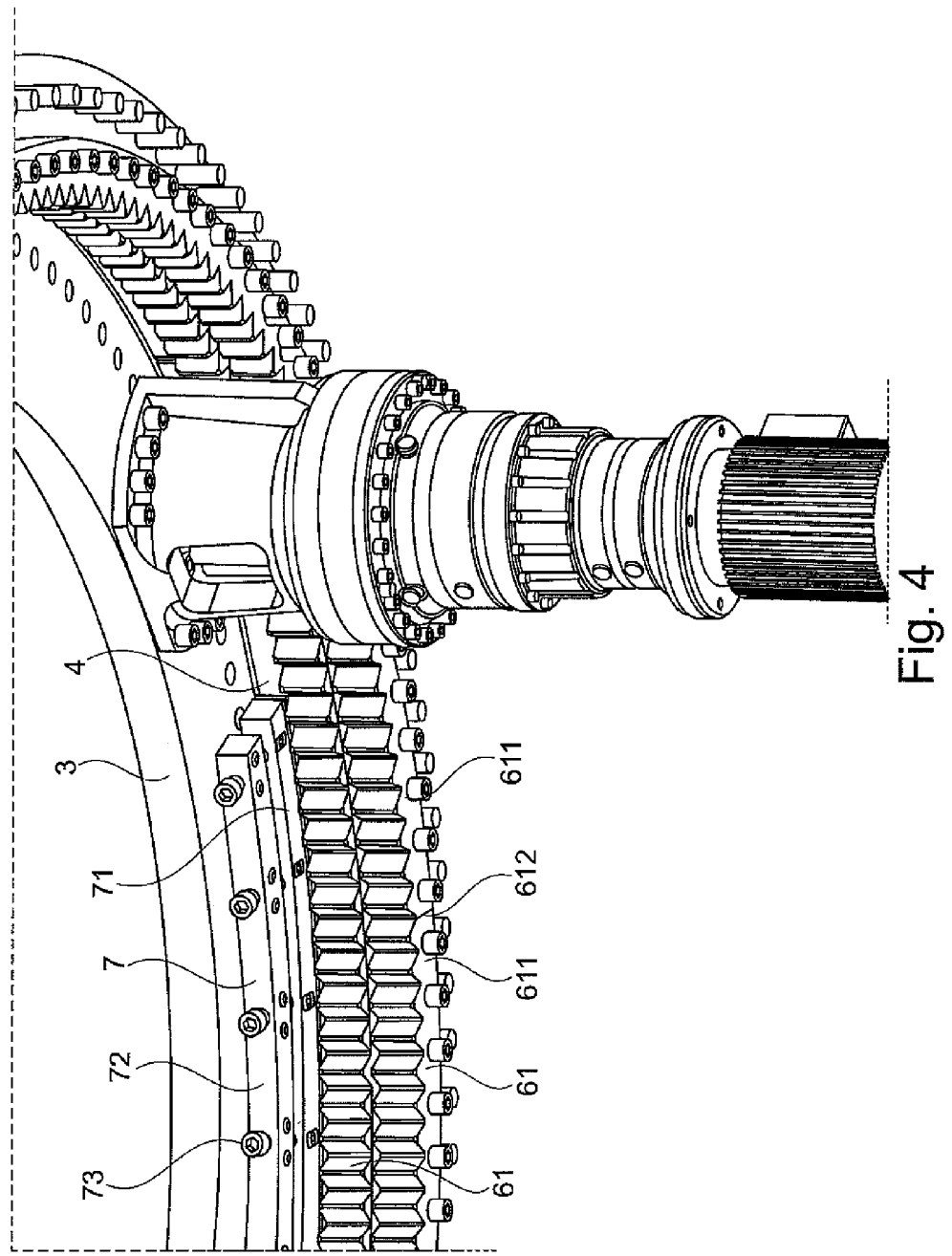
FIG. 4 shows a perspective view from below of a part of the yaw system in FIG. 2.

As can be seen in FIG. 4, the yaw system comprises radial adjustment elements 7, (only one partly shown in FIG. 4), fixedly connected to a lower side of the insert portion 3. Preferably, a plurality of adjustment elements 7, e.g. four, are distributed circumferentially in the yaw system, for adjustment of the nacelle 102 in relation to the tower 1 in all radial directions. Each adjustment element 7 comprises an adjustment portion 71 adapted to act on the clamp portion 4 so at to adjust the radial position of the insert portion 3 in relation to the clamp portion 4. For this, the adjustment portion 71 can be moved in relation to a fixed portion 72 of adjustment element 7 by means of bolts 73.

As can also be seen in FIG. 4, each ring member 61 comprises of a plurality of circumferentially distributed ring segments 611. The ring segments 611 of one ring member 61 are circumferentially staggered in relation to the ring segments 611 of the other ring member 61, so that joints 612 between ring segments 611 in one ring member 61 are not aligned with joints 612 between ring segments 611 in the other ring member 61.

What is claimed is:

1. A wind turbine comprising a tower and a nacelle mounted on top of the tower, the turbine further comprising:
   a bearing for a yaw motion of the nacelle in relation to the tower, the bearing having a clamp portion and an insert portion, the insert portion received in clamping engagement with the clamp portion, and
   at least one power unit fixedly connected to the nacelle, the power unit comprising:
      a motor and
      a wheel adapted to be driven by the motor and in engagement with a ring fixedly connected to the tower for effecting the yaw motion,
   wherein a region of engagement of the ring with the wheel is located below clamping engagement regions of the clamp and insert portions of the bearing.

2. The wind turbine according to claim 1, wherein the ring is located inside the tower.

3. The wind turbine according to claim 1, wherein the region of engagement of the ring with the wheel is located on an inner side of the ring.

4. The wind turbine according to claim 1, wherein the ring comprises at least two ring members distributed in the longitudinal direction of the tower.

5. The wind turbine according to claim 1, wherein each ring member comprises a plurality of circumferentially distributed ring segments, wherein the ring segments of one ring member are circumferentially staggered in relation to the ring segments of another ring member, so that joints between ring segments in the one ring member are not aligned with joints between ring segments in the other ring member.

6. The wind turbine according to claim 1, wherein the insert portion is fixedly connected to the nacelle, and the clamp portion is fixedly connected to the tower.

7. The wind turbine according to claim 6, wherein the at least one power unit is mounted on the insert portion.

8. The wind turbine according to claim 6, comprising at least one radial adjustment element fixedly connected to the nacelle, and comprising an adjustment portion adapted to act on the tower or a part fixedly connected thereto so as to adjust the radial position of the nacelle in relation to the tower.

9. The wind turbine according to claim 1, wherein the motor is located below the wheel.

10. A wind turbine comprising a tower and a nacelle mounted on top of the tower, the turbine further comprising:
   a bearing for a yaw motion of the nacelle in relation to the tower, and
   at least one power unit fixedly connected to the nacelle, the power unit comprising:
      a motor and
      a wheel adapted to be driven by the motor and in engagement with a ring fixedly connected to the tower for effecting the yaw motion,
   wherein the bearing is a friction bearing comprising an insert portion fixedly connected to the nacelle, and a clamp portion fixedly connected to the tower and in clamping engagement with the insert portion at an upper engagement region and a lower engagement region, and
   wherein a region of engagement of the ring with the wheel is separated from a region between the upper and lower engagement regions of the bearing.

11. The wind turbine according to claim 10, wherein the region of engagement of the ring with the wheel is located below the upper and lower engagement regions of the bearing.

12. The wind turbine according to claim 10, wherein the ring is located inside the tower.

13. The wind turbine according to claim 10, wherein the region of engagement of the ring with the wheel is located on an inner side of the ring.

14. The wind turbine according to claim 10, wherein the ring comprises at least two ring members distributed in the longitudinal direction of the tower.

15. The wind turbine according to claim 10, wherein each ring member comprises a plurality of circumferentially distributed ring segments, wherein the ring segments of one ring member are circumferentially staggered in relation to the ring segments of another ring member, so that joints between ring segments in the one ring member are not aligned with joints between ring segments in the other ring member.

16. The wind turbine according to claim 10, wherein the at least one power unit is mounted on the insert portion.

17. The wind turbine according to claim 10, comprising at least one radial adjustment element fixedly connected to the nacelle, and comprising an adjustment portion adapted to act on the tower or a part fixedly connected thereto so as to adjust the radial position of the nacelle in relation to the tower.

18. The wind turbine according to claim 10, wherein the motor is located below the wheel.

* * * * *